United States Patent
Malani et al.

(10) Patent No.: US 11,619,532 B2
(45) Date of Patent: Apr. 4, 2023

(54) REPLACEABLE, GAMMA STERILIZABLE CORIOLIS FLOW SENSORS

(71) Applicant: Malema Engineering Corporation, Boca Raton, FL (US)

(72) Inventors: Deepak Bhagwan Malani, Boca Raton, FL (US); Jayasekar Rajagopalan, Cupertino, CA (US); Claus Waldersdorff Knudsen, Fremont, CA (US); Renato De Castro, Cupertino, CA (US)

(73) Assignee: Malema Engineering Corporation, Boca Raton, FL (US)

( * ) Notice: Subject to any disclaimer, the term of this patent is extended or adjusted under 35 U.S.C. 154(b) by 0 days.

(21) Appl. No.: 17/718,197

(22) Filed: Apr. 11, 2022

(65) Prior Publication Data

US 2022/0236092 A1    Jul. 28, 2022

Related U.S. Application Data

(63) Continuation-in-part of application No. 17/523,185, filed on Nov. 10, 2021, and a continuation-in-part of application No. 17/702,554, filed on Mar. 23, 2022, which is a continuation of application No. 16/846,061, filed on Apr. 10, 2020, now Pat. No. 11,300,435.

(60) Provisional application No. 63/274,841, filed on Nov. 2, 2021.

(51) Int. Cl.
*G01F 1/84* (2006.01)

(52) U.S. Cl.
CPC .................. *G01F 1/8477* (2013.01)

(58) Field of Classification Search
None
See application file for complete search history.

(56) References Cited

U.S. PATENT DOCUMENTS

| | | |
|---|---|---|
| 3,803,912 A | 4/1974 | Ohno |
| 4,252,028 A | 2/1981 | Smith et al. |
| 4,491,025 A | 1/1985 | Smith et al. |

(Continued)

FOREIGN PATENT DOCUMENTS

| | | |
|---|---|---|
| CN | 87107806 A | 6/1988 |
| CN | 1426531 A | 6/2003 |

(Continued)

OTHER PUBLICATIONS

Scientific Reports—Effective Gamma-Ray Sterilization and Characteristic of Conductive Polypyrrole Biomaterials—Semin Kim et al. www.nature.com/sceintificreports (Year: 2018).*

(Continued)

*Primary Examiner* — Harshad R Patel
(74) *Attorney, Agent, or Firm* — Fish & Richardson P.C.

(57) ABSTRACT

A Coriolis flow sensor includes a metal flow tube and an enclosure. The enclosure encloses the flow tube and is constructed at least partially from a gamma transparent material. The metal flow tube may be constructed from stainless steel. The gamma transparent material and the flow tube are thin enough to permit sterilization of an interior of the flow tube by gamma irradiation of the flow tube through the gamma transparent material. The enclosure is also shaped to facilitate locking and unlocking the Coriolis flow sensor in place on a mounting structure.

20 Claims, 11 Drawing Sheets

(56) References Cited

U.S. PATENT DOCUMENTS

| | | |
|---|---|---|
| 4,768,385 A | 9/1988 | Cage |
| 4,823,613 A | 4/1989 | Cage et al. |
| 4,934,196 A | 6/1990 | Romano |
| 5,038,620 A | 8/1991 | Rogers et al. |
| 5,343,764 A | 9/1994 | Mattar et al. |
| 5,373,634 A | 12/1994 | Lipp |
| 5,373,745 A | 12/1994 | Cage |
| 6,156,144 A | 12/2000 | Lueghamer |
| 6,383,423 B1 | 5/2002 | Kurokawa et al. |
| 6,450,042 B1 | 9/2002 | Lanham et al. |
| 6,598,488 B1 | 7/2003 | Sutton et al. |
| 6,662,120 B2 | 12/2003 | Drahm et al. |
| 6,748,813 B1* | 6/2004 | Barger .............. G01F 1/8472 73/861.354 |
| 6,776,053 B2 | 8/2004 | Schlosser et al. |
| 6,802,224 B2 | 10/2004 | Nakao et al. |
| 6,904,667 B2 | 6/2005 | Lanham et al. |
| 7,127,815 B2 | 10/2006 | Schlosser et al. |
| 7,350,421 B2 | 4/2008 | Anklin-Imhof et al. |
| 7,562,585 B2 | 7/2009 | Schuetze et al. |
| 7,716,995 B2 | 5/2010 | Patten et al. |
| 8,404,076 B2 | 3/2013 | Young et al. |
| 8,887,578 B2 | 11/2014 | Young et al. |
| 9,677,921 B2 | 6/2017 | Young |
| 10,209,113 B2 | 2/2019 | Young et al. |
| 10,260,922 B2 | 4/2019 | Young |
| 2002/0139199 A1 | 10/2002 | Lanham et al. |
| 2003/0097882 A1 | 5/2003 | Schlosser et al. |
| 2003/0191598 A1 | 10/2003 | Normen |
| 2005/0103122 A1 | 5/2005 | Dille |
| 2005/0252307 A1 | 11/2005 | Andresen et al. |
| 2006/0048897 A1 | 3/2006 | Temple |
| 2006/0201260 A1 | 9/2006 | Drahm et al. |
| 2009/0075129 A1 | 3/2009 | Sparks et al. |
| 2010/0251830 A1 | 10/2010 | Bitto et al. |
| 2010/0331644 A1* | 12/2010 | Neale .............. A61N 1/05 600/345 |
| 2011/0000315 A1 | 1/2011 | Tsubota et al. |
| 2011/0167910 A1 | 7/2011 | Storm et al. |
| 2011/0197650 A1 | 8/2011 | Young et al. |
| 2013/0042700 A1 | 2/2013 | Wang et al. |
| 2013/0086986 A1 | 4/2013 | Lanham et al. |
| 2013/0174670 A1 | 7/2013 | Young et al. |
| 2014/0060161 A1* | 3/2014 | Schick .............. G01F 1/00 73/53.01 |
| 2014/0174561 A1 | 6/2014 | Hagihara et al. |
| 2014/0188421 A1 | 7/2014 | Fraser et al. |
| 2015/0053021 A1 | 2/2015 | Young |
| 2015/0268082 A1 | 9/2015 | Kirst et al. |
| 2015/0300861 A1 | 10/2015 | Regen et al. |
| 2015/0377673 A1 | 12/2015 | Seeley et al. |
| 2017/0146380 A1 | 5/2017 | Young et al. |
| 2018/0179486 A1 | 6/2018 | Fadell et al. |
| 2019/0279888 A1 | 9/2019 | Gopalakrishnan et al. |
| 2020/0249071 A1 | 8/2020 | Cunningham et al. |
| 2020/0319006 A1 | 10/2020 | Malani et al. |
| 2021/0164826 A1 | 6/2021 | Mcanally et al. |
| 2021/0318154 A1 | 10/2021 | Malani et al. |
| 2022/0236092 A1* | 7/2022 | Malani .............. G01F 1/8472 |

FOREIGN PATENT DOCUMENTS

| | | |
|---|---|---|
| CN | 1882800 A | 12/2006 |
| CN | 102782463 A | 11/2012 |
| CN | 206989514 U | 2/2018 |
| EP | 0190810 A1 | 8/1986 |
| EP | 0258827 A1 | 3/1988 |
| JP | S63-18219 A | 1/1988 |
| JP | H08-052805 A | 2/1996 |
| JP | H09-501493 A | 2/1997 |
| JP | H09-057856 A | 3/1997 |
| JP | 2003-525437 A | 8/2003 |
| JP | 2005-510701 A | 4/2005 |
| JP | 2005-510703 A | 4/2005 |
| JP | 2011-058950 A | 3/2011 |
| JP | 2012-025008 A | 2/2012 |
| JP | 2013-519878 A | 5/2013 |
| TW | 201518692 A | 5/2015 |
| WO | WO 2017/190823 A1 | 11/2017 |

OTHER PUBLICATIONS

Materials MDPI—On the Potential of Bulk Metallic Glasses for Dental Implantology: by Alethea liens et al. (Year: 2018).*
The Engineering ToolBox—Metals and Alloys—Bulk Modulus Elasticity www.engineeringtoolbox.com (Year: 2008).*
English Translation of CN 206989514 U, Inventors Shengyin Zuo et al., Published Feb. 9, 2018, Translated Jun. 2021.
English Translation of WO 2017/190823 A1, Inventor Bernhard Muller, Published Nov. 9, 2017, Translated Jun. 2021.
European Patent Office, Extended European Search Report, European Patent Application No. 14838532.1, dated Sep. 7, 2016, 9 pages.
European Patent Office, Extended European Search Report, European Patent Application No. 21735838.1, dated Mar. 29, 2022, nine pages.
Korean Intellectual Property Office, Office Action, Korean Patent Application No. 10-2012-7023722, dated Jan. 15, 2014, ten pages.
PCT International Search Report and Written Opinion, PCT Application No. PCT/US2014/051861, dated Dec. 22, 2014, ten pages.
PCT International Search Report and Written Opinion, PCT Application No. PCT/US16/63398, dated Feb. 15, 2017, 14 pages.
PCT International Search Report and Written Opinion, PCT Application No. PCT/US20/26258, dated Jun. 29, 2020, 17 pages.
PCT International Search Report and Written Opinion, PCT Application No. PCT/US21/22497, dated Jun. 3, 2021, 11 pages.
State Intellectual Property Office of the People's Republic of China, First Office Action, Chinese Patent Application No. 201080063688.8, dated Apr. 4, 2014, six pages.
State Intellectual Property Office of the People's Republic of China, First Office Action, Chinese Patent Application No. 20140046308.8, dated Nov. 25, 2016, 22 pages.
State Intellectual Property Office of the People's Republic of China, Second Office Action, Chinese Patent Application No. 20140046308.8, dated Aug. 11, 2017, eight pages.
Taiwanese Intellectual Property Office, Office Action, Taiwanese Patent Application No. 103129070, dated Jun. 10, 2015, six pages.
Taiwanese Intellectual Property Office, Office Action, Taiwanese Application No. 105138710, dated Aug. 2, 2017, 10 pages.
Taiwanese Intellectual Property Office, Office Action, Taiwanese Application No. 105138710, dated May 17, 2018, 10 pages.
The Japan Patent Office, Office Action, Japanese Patent Application No. 2016-536409, dated Sep. 26, 2017, 5 pages.
U.S. Office Action, U.S. Appl. No. 14/464,089, filed Sep. 9, 2016, 8 pages.
U.S. Office Action, U.S. Appl. No. 14/464,089, filed Feb. 26, 2016, 7 pages.
U.S. Appl. No. 17/523,185, filed Nov. 10, 2021, Inventors Deepak Bhagwan Malani and Jayasekar Rajagopalan.

* cited by examiner

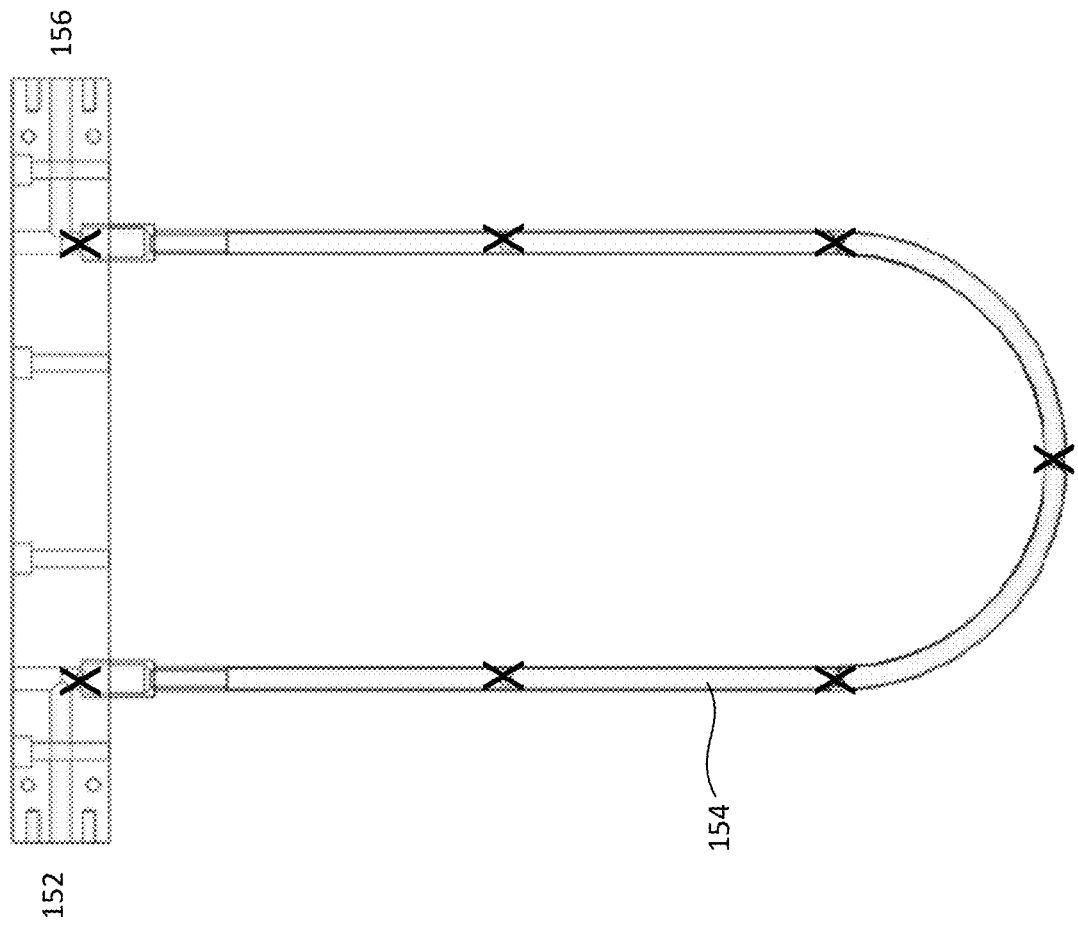

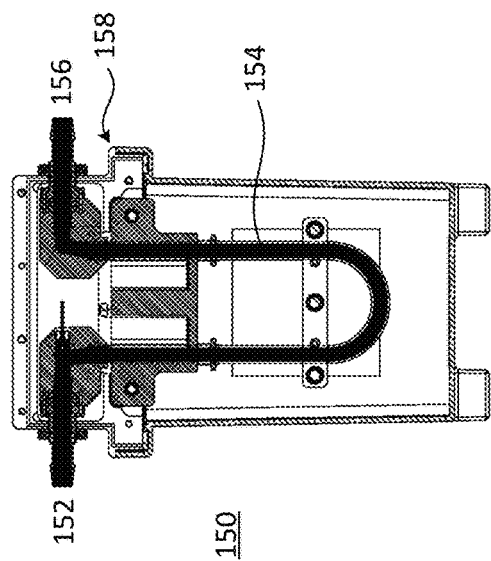
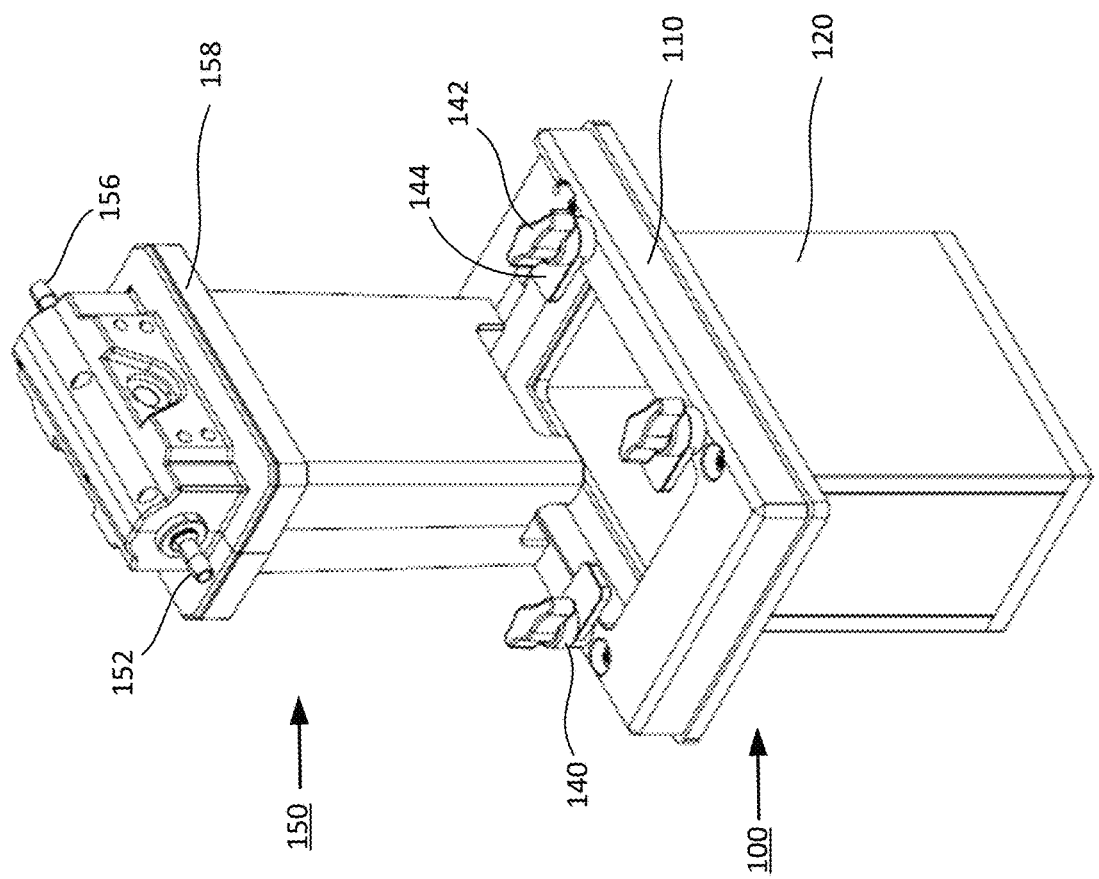

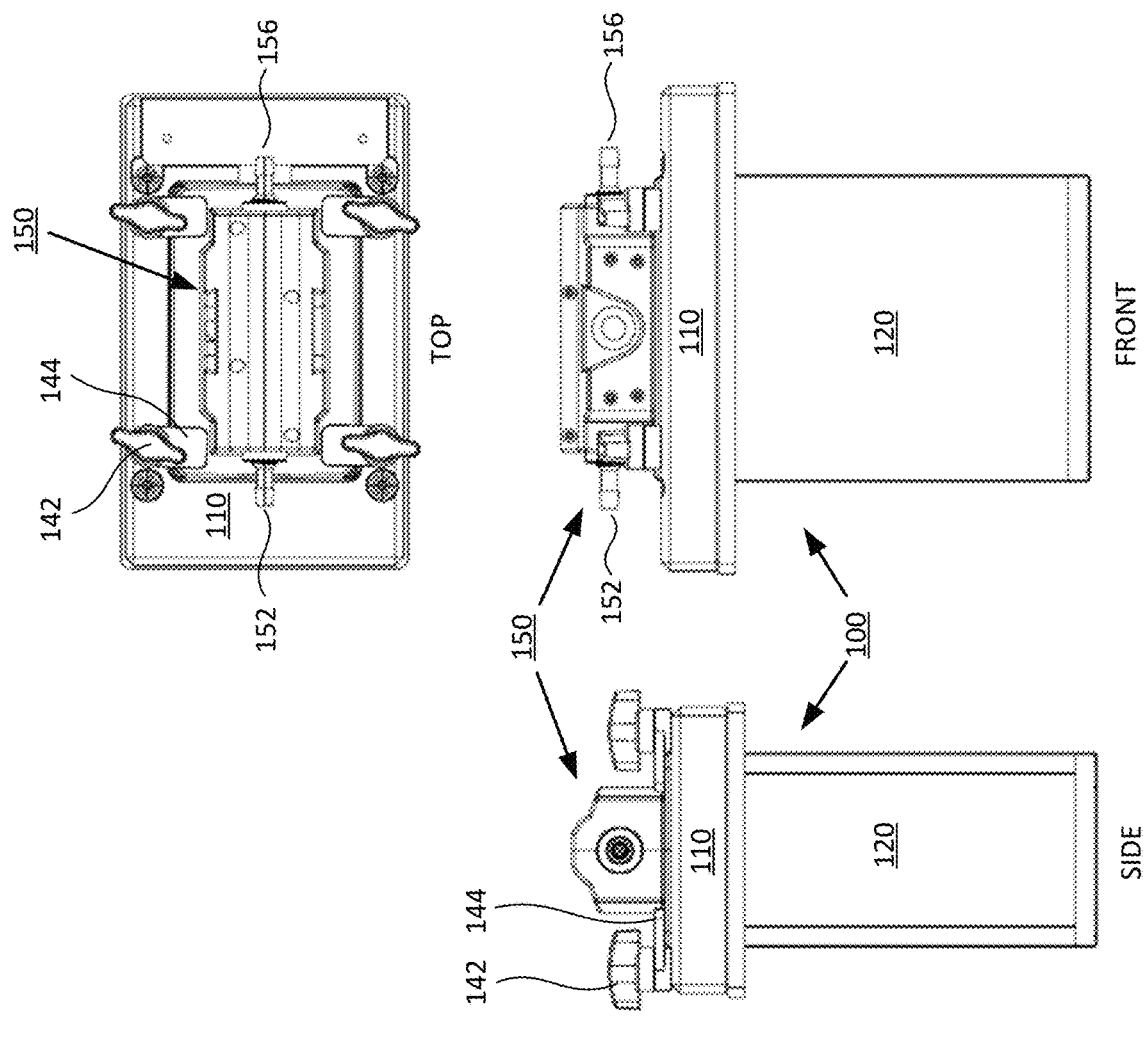
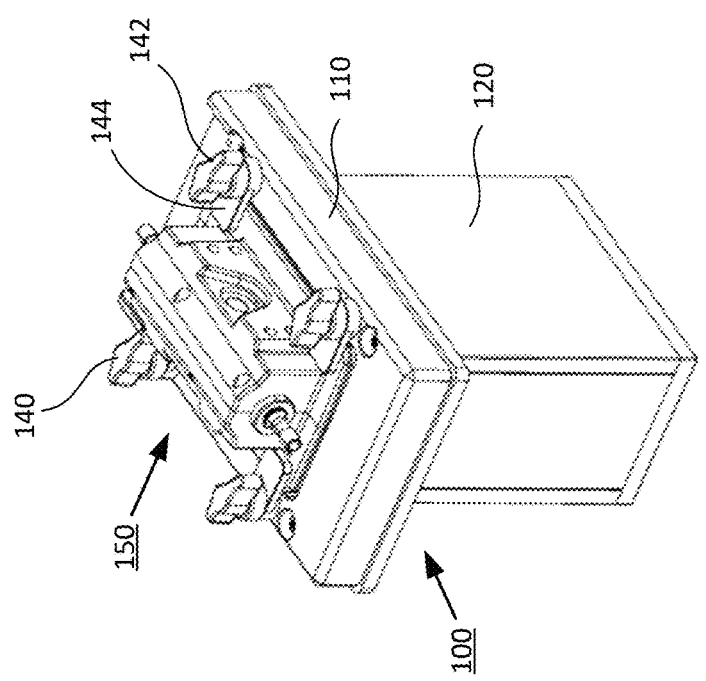
FIG. 4D
FIG. 4C

REPLACEABLE, GAMMA STERILIZABLE CORIOLIS FLOW SENSORS

CROSS-REFERENCE TO RELATED APPLICATION(S)

This application is a continuation-in-part of U.S. patent application Ser. No. 17/523,185, "Heavy Cradle For Replaceable Coriolis Flow Sensors," filed Nov. 10, 2021; which claims priority under 35 U.S.C. § 119(e) to U.S. Provisional Patent Application Ser. No. 63/274,841, filed Nov. 2, 2021. This application is also a continuation-in-part of U.S. patent application Ser. No. 17/702,554, "Coriolis Mass Flow Sensors Having Different Resonant Frequencies," filed Mar. 23, 2022; which is a continuation of U.S. patent application Ser. No. 16/846,061, "Coriolis Mass Flow Sensors Having Different Resonant Frequencies," filed Apr. 10, 2020. The subject matter of all of the foregoing is incorporated herein by reference in their entirety.

BACKGROUND

1. Technical Field

This disclosure relates generally to Coriolis flow sensors.

2. Description of Related Art

Many applications require the controlled flow of fluids. A flow process system usually includes a number of flow sensors to measure the flow rate of fluids. Coriolis flow sensors measure the flow rate of fluids based on vibrations caused by the Coriolis effect of fluid flowing through the sensor. However, in order to reduce cross-talk or destructive interference effects, conventional flow sensors may be attached to a large mass and the flow sensor itself may be constructed from heavy or thick materials.

However, these conventional designs can be expensive and are not suitable for single use or disposable applications. Also, sterilization of flow sensors having metal enclosures or metal components is typically implemented by using chemicals, which is not as effective and can cause cross-contamination of the flow sensors.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 3 shows a test setup to verify sterilization of a Coriolis flow sensor using gamma irradiation.

FIG. 4A shows a perspective view of a Coriolis flow sensor and a corresponding cradle.

FIG. 4B shows a cross section view of the Coriolis flow sensor.

FIG. 4C shows a perspective view of the Coriolis flow sensor locked into the cradle.

FIG. 4D shows top, front and side views of the Coriolis flow sensor locked into the cradle.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
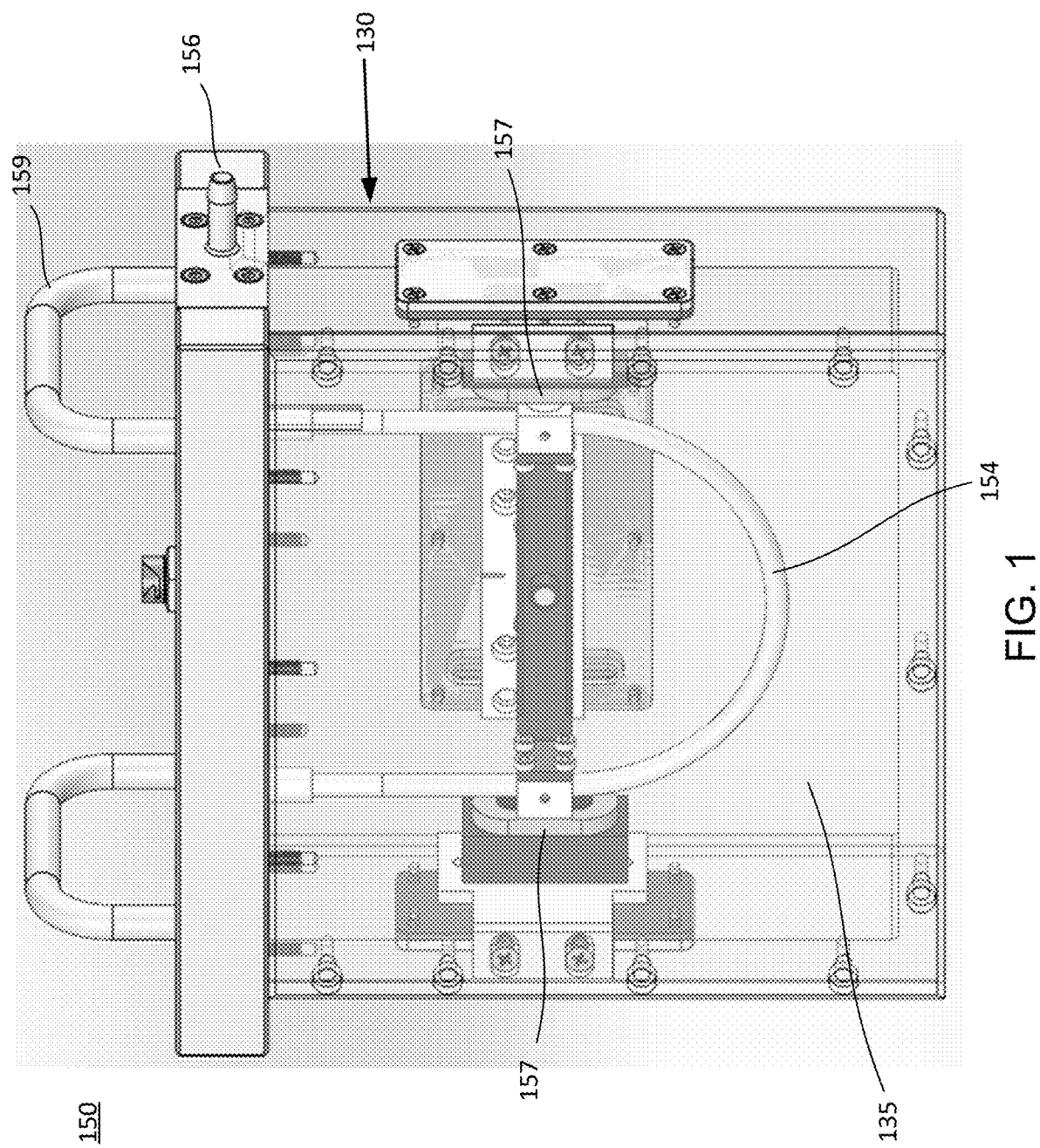
FIG. 1 shows a Coriolis flow sensor.

FIG. 1 shows a Coriolis flow sensor 150. The Coriolis flow sensor 150 is a device that measures the flow rate of a fluid based on vibrations caused by the Coriolis effect of the fluid flowing through the sensor. The flow sensor 150 includes an inlet (hidden in FIG. 1), a flow tube 154 (or two or more flow tubes in some designs) and an outlet 156. This provides a flow path for a fluid through the flow sensor 150. The flow tubes 154 can vibrate, for example as driven by magnets and coils 157. As the fluid flows through the flow tubes 154, Coriolis forces produce a twisting vibration of the flow tubes, resulting in a phase shift in the vibration of the flow tubes. The fluid flow also changes the resonant frequency of the flow tubes. The flow sensor 150 includes transducers that generate electrical signals that are sensitive to the phase shift and/or change in resonant frequency. These signals may be processed to determine the mass fluid flow rate and/or density of the fluid.

It is desirable for the Coriolis flow sensor to have good accuracy over a broad operating range. As a result, the flow tubes may be constructed from materials with a high Young's modulus (tensile modulus), for example a Young's modulus of at least 50 GPa. The flow tubes may be metal flow tubes. They may be constructed from stainless steel, such as 316, 316L, 304 or 304L stainless steel. Other possible metals include Hastelloy, monel, nickel, titanium, and tantalum. Non-metals may also be used, such as zirconium. Table 1 tabulates Young's modulus for a number of different materials.

TABLE 1

Young's modulus for different materials

| Material | Young's modulus (GPa) |
| --- | --- |
| Steel, stainless 304, 304L, 316, or 316L | 193 |
| Tantalum | 186 |
| Titanium | 116 |
| Titanium alloy | 110 |
| Hastelloy | 205 |
| Monel metal | 179 |
| Zirconium | 94.5 |

The Coriolis flow sensor may have an operating range that ranges from 25 ml/min, or 20 ml/min or 15 ml/min or less on the low side, up to 4000 ml/min or 5000 ml/min or more on the high side, for ¼" diameter flow tubes. Operating ranges will be different for different size flow tubes. 2" diameter flow tubes may have operating ranges up to 350 l/min or more. The operating range may be characterized by a turndown ratio, which is the ratio of the maximum flow rate divided by the minimum flow rate. The flow sensor may have an accuracy of +/−1% of the actual flow rate over the operating range.

Figure 2:
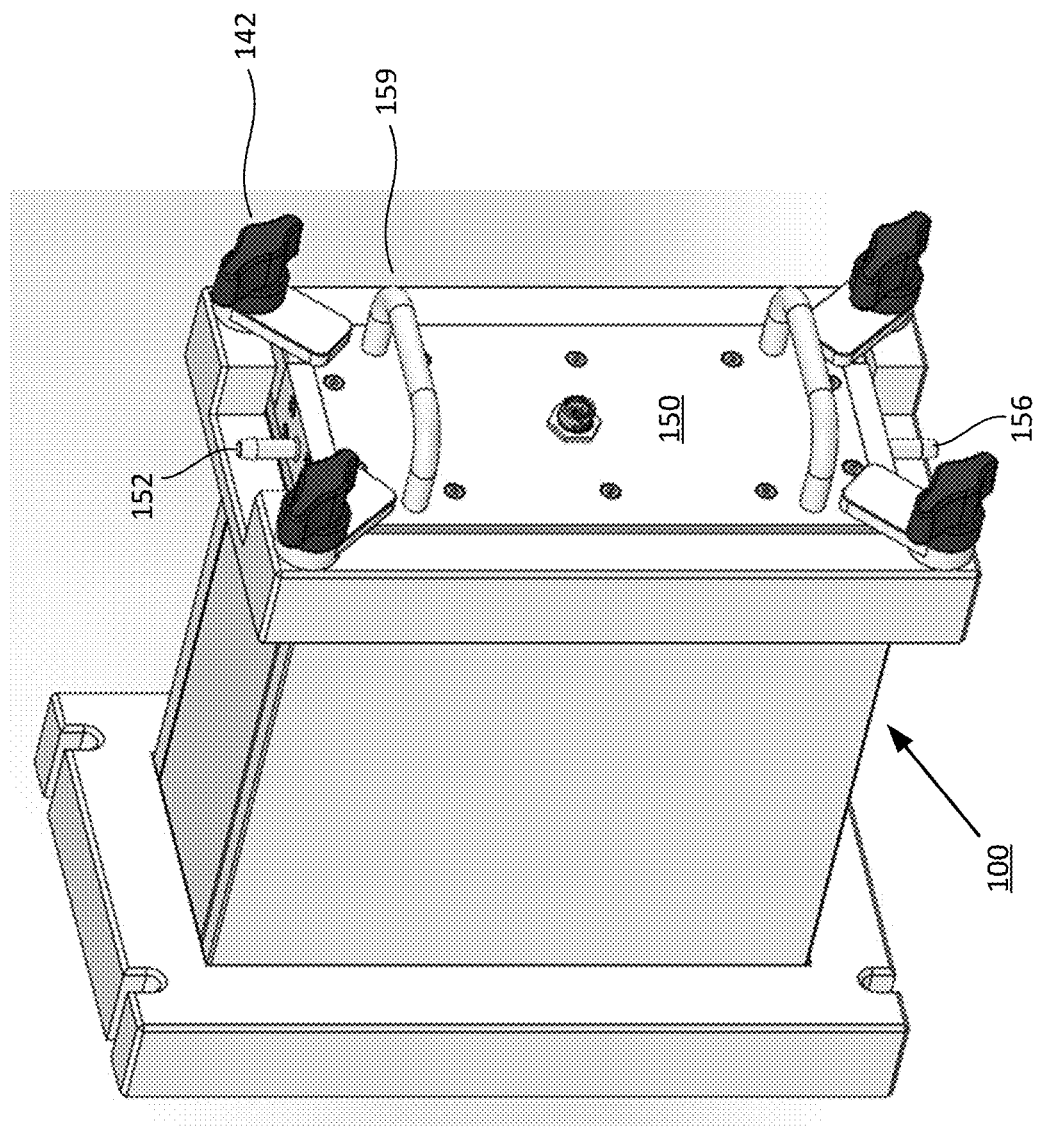
FIG. 2 shows a Coriolis flow sensor inserted into a corresponding cradle.

The Coriolis flow sensor is designed to be disposable or single use. Accordingly, the tubes 154 are enclosed in an enclosure 130. The enclosure 130 may be locked and unlocked in place on a mounting structure, as shown in FIG. 2. FIG. 2 shows a Coriolis flow sensor 150 locked into place in a cradle 100. Handles 159 may be used to insert the flow sensor 150 into the cradle 100, and to remove the flow sensor 150 from the cradle. The inlet 152 and outlet 156 are visible in FIG. 2, but the flow tubes are not visible since they are within the cradle 100. In this example, the locking mechanism is four thumb screws 142. The enclosure 130 is shaped to slide into and out of the cradle 100.

The Coriolis flow sensor 150 is also designed to permit sterilization by gamma irradiation. Parts of the enclosure 130 are constructed from gamma transparent material, which are materials that have low attenuation of gamma irradiation. In FIG. 1, the side panels 135 are polycarbonate or other types of plastic. As a result, the interior of the flow tube 154 may be sterilized by gamma irradiation. The side panel 135 is thin enough and the walls of the flow tube 154 are thin enough to allow sufficient gamma irradiation to reach the inside of the flow tube. For example, the side panel 135 may be polycarbonate which readily passes gamma irradiation and the flow tubes may have a wall thickness not greater than 0.020". The wall thickness will vary depending on the size of the flow tubes. Table 2 below shows wall thicknesses for different size seamless stainless flow tubes. Maximum wall thicknesses may be approximately two times what is shown in Table 2.

TABLE 2

Wall thickness for different size flow tubes

| Outer diameter of flow tube (inches) | Wall thickness (inches) |
|---|---|
| 1/4" | 0.020 |
| 3/8" | 0.028 |
| 1/2" | 0.035 |
| 3/4" | 0.035 |
| 1" | 0.049 |
| 2" | 0.065 |

The Coriolis flow sensor 150 also includes memory used to store calibration data or other types of data for the Coriolis flow sensor. If gamma sterilization is used, this memory may be gamma stable memory.

FIG. 3 shows a test setup to verify sterilization of a Coriolis flow sensor using gamma irradiation. For clarity, FIG. 3 shows only the flow tube 154 and not the enclosure 130. Gamma dosimeters are placed inside the flow tube 154 at the locations shown. The Coriolis flow sensor, including the plastic enclosure 130, is irradiated by gamma irradiation. The dosimeters indicate that sufficient radiation reaches the interior of the flow tube 154 to sterilize the flow sensor. The plastic walls of the enclosure 130 and walls of the flow tube 154 are thin enough to pass sufficient gamma irradiation.

In some designs, the Coriolis flow sensor may also be sterilized by other methods: ethylene oxide cleaning, sodium hydroxide cleaning or x-ray sterilization for example. If the Coriolis flow sensor is used multiple times (e.g., multi-use applications or continuous use applications), it may be sterilized between uses. To avoid having to remove the Coriolis flow sensor, it may be designed for clean-in-place processes or steam-in-place processes. Thus, the same flow sensor may be suitable for use in single-use applications, in multi-use applications and in continuous use applications.

The figures show examples of Coriolis flow sensors, but it should be understood that other types of Coriolis flow sensors may also be used. The number and shapes of tubes, the material and construction of the tubes and flow sensor, and the arrangement of the inlet and outlet may all be changed depending on the specific design of the Coriolis flow sensor. The Coriolis flow sensor may include one flow tube, or two or more flow tubes. The flow tubes may have different shapes in different flow sensors: a U-tube, a V-tube, an omega tube, or a straight tube, for example. Typically, Coriolis flow sensors are sized with connections from 1/16" to 2" hose barbs or tri-clamp fittings. Other types of fittings may also be used on Coriolis flow sensors. Typical flow ranges of these flow sensors range from 0.05 gm/min to 0.5 gm/min for the smallest (1/16" hose barb connections) size to 10 kg/min to 350 kg/min for the largest (2") size. Typical accuracies range from 0.1% to 1.0% of actual reading.

Figure 5B:
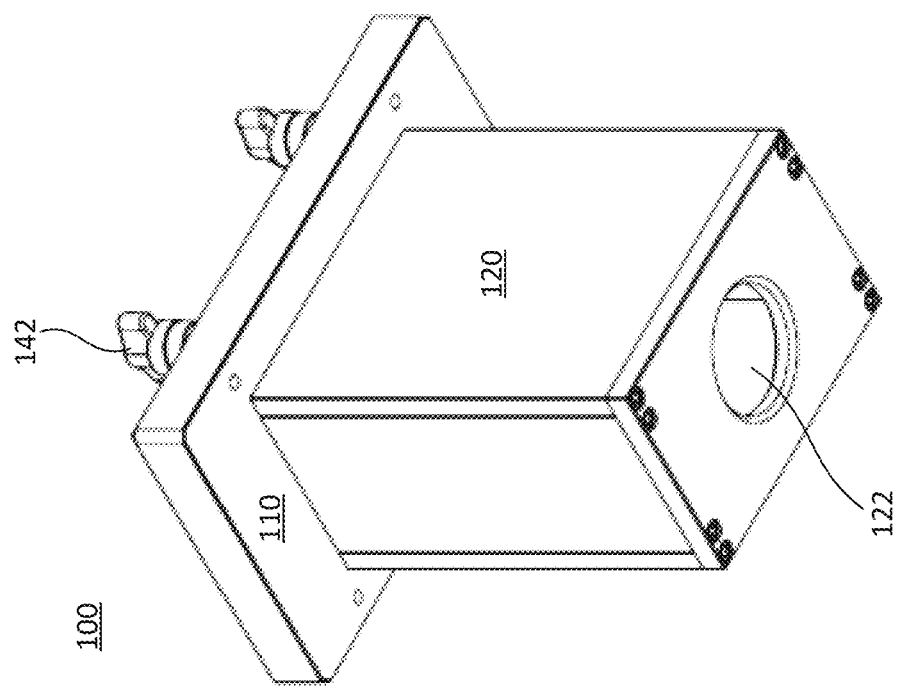
FIGS. 5A and 5B show top perspective and bottom perspective views of the cradle.
Figure 5A:
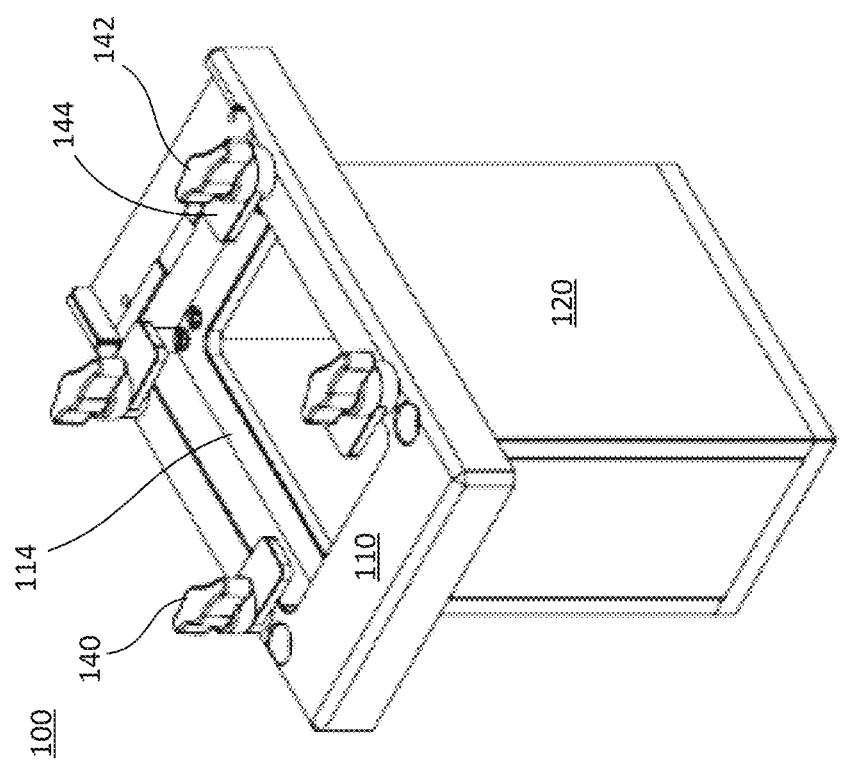

FIGS. 4-5 show different views of example embodiments of a Coriolis flow sensor 150 and corresponding cradle 100. FIG. 4 shows both the Coriolis flow sensor 150 and the cradle 100, where FIG. 4A is an exploded view, FIG. 4B shows just the flow sensor, FIG. 4C shows the assembled system, and FIG. 4D shows top, front and side views of the assembled system. FIGS. 5A and 5B are perspective views that show just the cradle 100 and locking mechanism 140.

The flow sensor 150 can be seen in cross section in FIG. 4B. The flow sensor 150 includes an inlet 152, a flow tube 154 (or two flow tubes in some designs) and an outlet 156. Because Coriolis flow sensors operate based on changes in the vibration of the flow tubes, vibration effects that are caused by sources other than the fluid flow may introduce inaccuracies. For example, if the flow sensor and other devices are mounted on a common support structure, then vibrations from pumps and other devices may mechanically couple to the flow sensor through the supporting structure. The vibration of the flow tubes may also be distorted or otherwise changed through resonant coupling to the surrounding support structure.

Zero drift is one such effect. Coriolis flow sensors are electrically powered on, even when they are not measuring flow. So when there is no flow being pumped or flowing through the Coriolis Flow tubes, the tubes continue to vibrate. Sometimes these tubes are empty and sometimes there is liquid in these tubes. Zero drift is a phenomenon which shows some minimal flow rate occurring when there is no real actual flow. One instance of zero drift is when there is dormant fluid left in the Coriolis flow tubes and a certain amount of sloshing occurs. This minimal flow rate is very small and is usually a very small percentage of the minimum flow rate of each Coriolis flow sensor. In addition, vibrations from external mechanical devices such as pumps and valves also cause zero drift by interfering with the analog or digital output signal from a Coriolis flow sensor by contributing to it.

One way to reduce zero drift is to increase the mass of the flow sensor. More mass dampens out external mechanical vibrating interferences and also the sloshing of dormant liquid will be subdued due to heavier mass.

However, in some applications, the Coriolis flow sensors are not permanent. They are intended to be replaced fairly regularly. They may even be single use or considered to be disposable. Single use or disposable Coriolis flow sensors are used in the bio-pharmaceutical and pharmaceutical industries to manufacture vaccines including vaccines for Covid-19, active pharmaceutical ingredients for cell and gene therapy and nuclear medicine manufacturing.

In these cases, it is desirable to make the Coriolis flow sensor as lightweight and inexpensive as possible, so making a large and massive Coriolis flow sensor is not desirable. In addition, some applications may also require the sterilization of flow sensors. Gamma irradiation may be used to sterilize the flow sensor, in which case the flow sensor is constructed from materials that are gamma irradiatable, for example to a minimum of 25 kGy or 50 kGy or 65 kGy which may be the irradiation levels used for sterilization in certain bio-pharma applications.

In the examples shown herein, the effective mass of the Coriolis flow sensor 150 is increased by locking it to a heavy cradle 100 when it is in use. The cradle 100 has a mass that preferably is at least 10 to 30 times the mass of the Coriolis flow sensor. For example, typical Coriolis flow sensors may have masses in the range of 0.2 kg~3 kg and typical mass for the heavy cradle may then be 5 kg~80 kg.

The cradle 100 has a mounting structure 114 (see FIG. 5A) for the Coriolis flow sensor 100, and a locking mechanism 140 is used to lock and unlock the Coriolis flow sensor in place on the mounting structure. The locking mechanism produces sufficient locking force when locked that the Coriolis flow sensor 150 and cradle 100 (as shown in FIG. 4A) vibrate together as a unitary body.

In the example of FIGS. 4-5, the cradle 100 includes a rectangular metal collar 110 which accounts for a significant amount of the mass of the cradle. The collar 110 has a rectangular aperture with an interior lip 114, which is most visible in FIG. 5. The lip is also rectangular and annular in shape. The flow sensor 150 includes a plastic housing with a ridge 158. The ridge 158 fits into the aperture of the metal collar 110 and presses against the lip 114 shown in FIG. 5A. The locking mechanism 140 applies force to the ridge 158 to hold the ridge rigidly against the lip 114. The flow tubes 154 protrude through the annular opening in the lip 114.

In this example, the locking mechanism 140 uses thumb screws 142 to create the force. When tightened, the thumb screws 142 apply pressure to tongues 144, which in turn press the ridge 158 against the interior lip 114 of the metal collar 110. The thumb screws are designed to apply a specific amount of force. In the example shown, the force is applied at four locking points arranged in a rectangular shape, although other arrangements are also possible. The applied force should be large enough to adequately reduce vibration of the flow sensor 150 relative to the collar 110. As a result, the flow sensor 150 and cradle 100 will vibrate as a unitary body and the cradle 100 will effectively increase the mass of the flow sensor 150, rather than the two vibrating relative to each other. For example, each of the thumb screws 142 may apply 3 Newton-meters (Nm) of force or more, to hold the flow sensor 150 and cradle 100 rigidly relative to each other. This is an aggregate force of 12 Nm or more for all of the thumb screws. In other designs, lower locking forces may be acceptable, for example 10 Nm or more, or 5 Nm or more.

Applying uniform force is also important. Applying the same force at the four locking points allows for the pressure applied to be balanced. If the forces at the different locking points were not the same, the sensor would be imbalanced and the zero drift and resulting inaccuracy would be higher. In FIGS. 4-5, the same amount of force should be applied to each locking point. For example, the force applied at each of the locking points may be within 15% of each other, or more preferably within 10%, within 5% or even within 1% of each other.

One advantage of using thumb screws 142 is that the locking mechanism may be operated manually. The thumb screws 142 may be loosened, the tongues 144 rotated or swiveled away to release the flow sensor 150, and the flow sensor removed and replaced with another flow sensor. This facilitates the replacement of flow sensors, including disposable and single use flow sensors. In some single use or disposable applications, the flow sensors may be removed and replaced in one minute or less.

The cradle 100 also includes enclosure 120, which encloses the rest of the Coriolis flow sensor. The enclosure also adds mass. The enclosure shown in FIGS. 4-5 includes a cable hole 122 (see FIG. 5B) to allow power and data connections to the flow sensor for sensors with rear connecting cables. FIG. 1 shows a top mounting cable connection.

Figure 6:
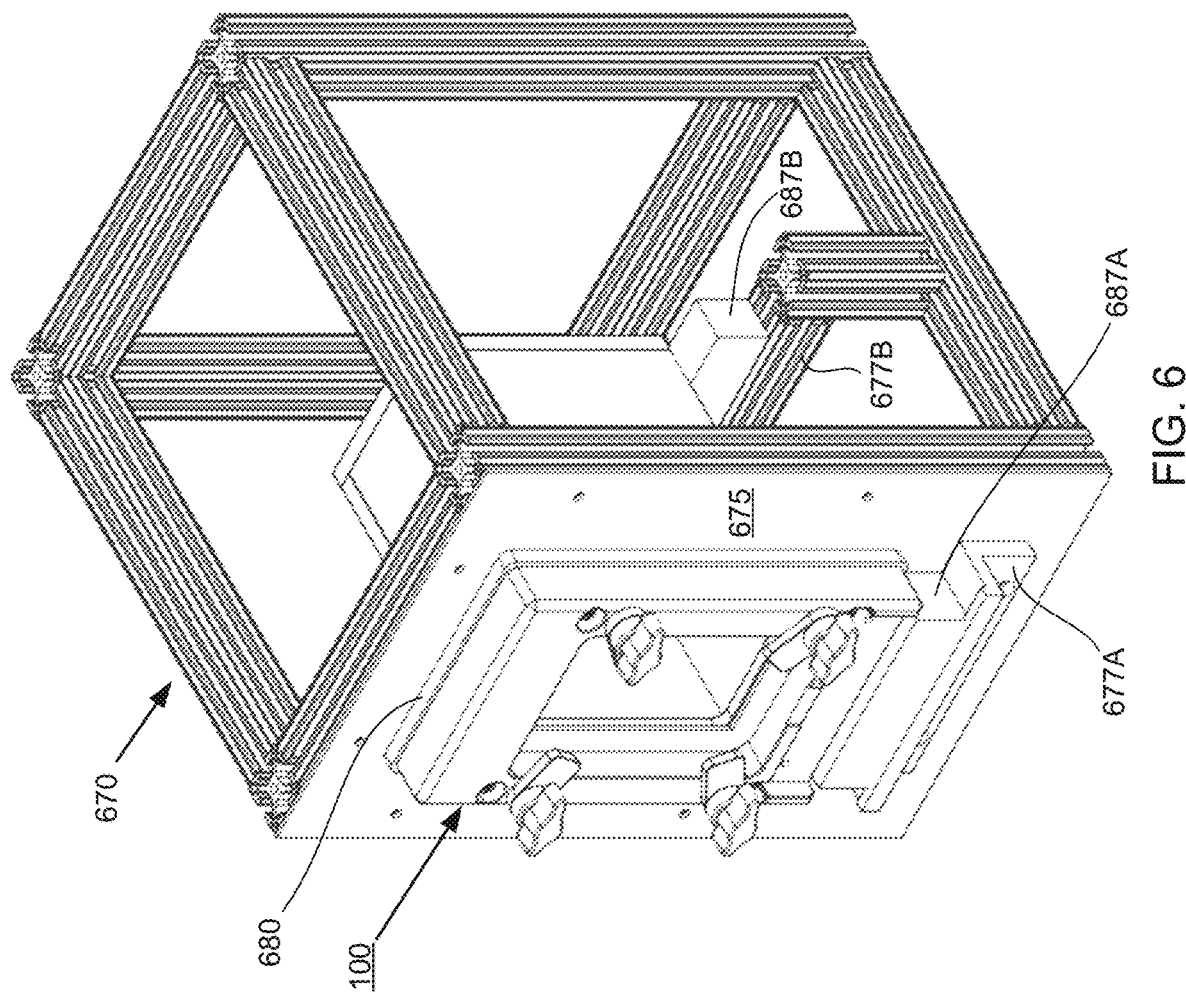
FIG. 6 shows the cradle attached to a skid.

FIG. 6 shows the cradle 100 attached to a skid 670. A skid is a mechanical framework on which equipment may be mounted. In this example, the cradle 100 is attached to a metal plate or panel 675, which is attached to the skid 670. A vibration dampening gasket 680 is positioned between the cradle 100 and the plate 675. In the vertical direction, the cradle 100 is supported by cross members 677A (an L bracket) and 677B (a cross beam of the skid). Vibration dampening gaskets 687A and 687B are positioned between the cradle 100 and the cross members 677A and 677B.

Note that the heavy cradle 100 does not make direct contact with any part of the skid 670. It is always separated by vibration gaskets 680, 687. The gaskets 680, 687 provide vibration isolation between the cradle 100 and the skid 670 (and other components mounted on the skid). For example, the vibration gaskets may significantly dampen low frequency vibrations.

The heavy cradle 100 adds mass to the Coriolis flow sensor 150, and the vibration gaskets 680, 687 isolate the cradle and flow sensor from the rest of the flow process system. As a result, zero drift is reduced. For example, for smaller size sensors (e.g., tubing of ½ inch and less), zero drift was reduced from 100 g/min to 2.5 g/min. Typical minimum flow rate for these sensors is 500 g/min, so the zero drift is reduced to less than 1% of the minimum flow rate. For larger sensors (e.g., ¾ and 1 inch tubing), zero drift was reduced from 200 g/min to 25 g/min. A typical minimum flow rate for these sensors is 6 kg/min, so the zero drift is reduced to less than 1% of the minimum flow rate.

Figure 7B:
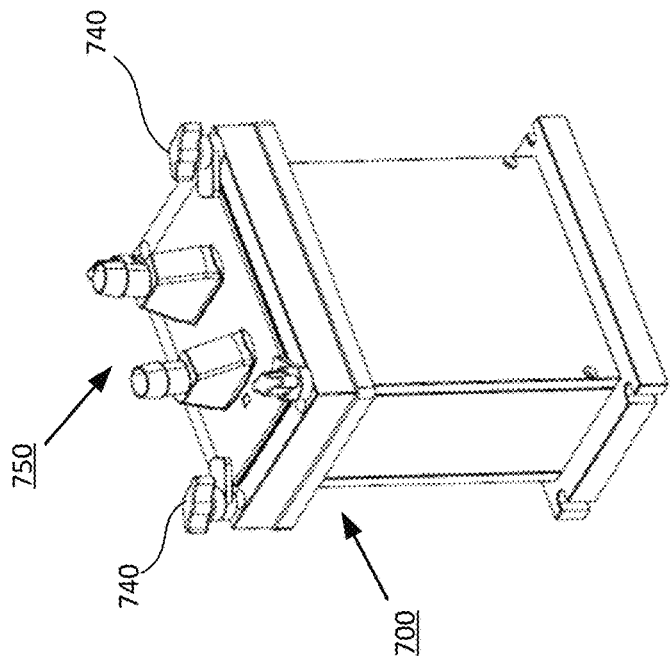
FIGS. 7A and 7B show perspective views of another embodiment of a Coriolis flow sensor and corresponding cradle.
Figure 7A:
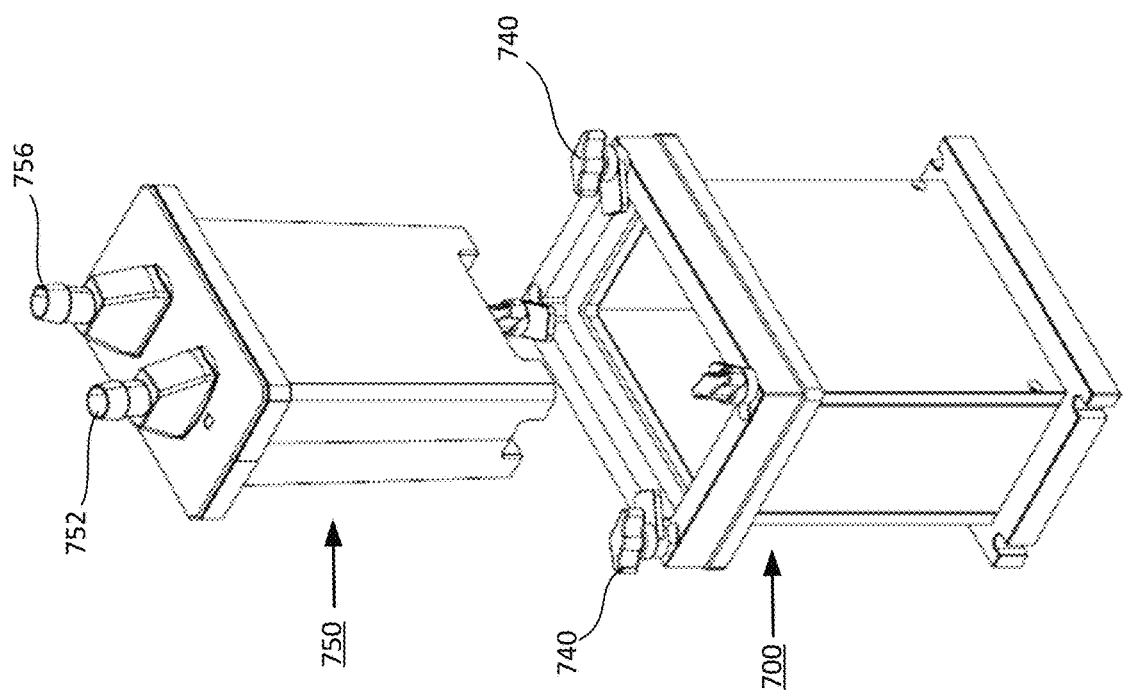
Figure 8B:
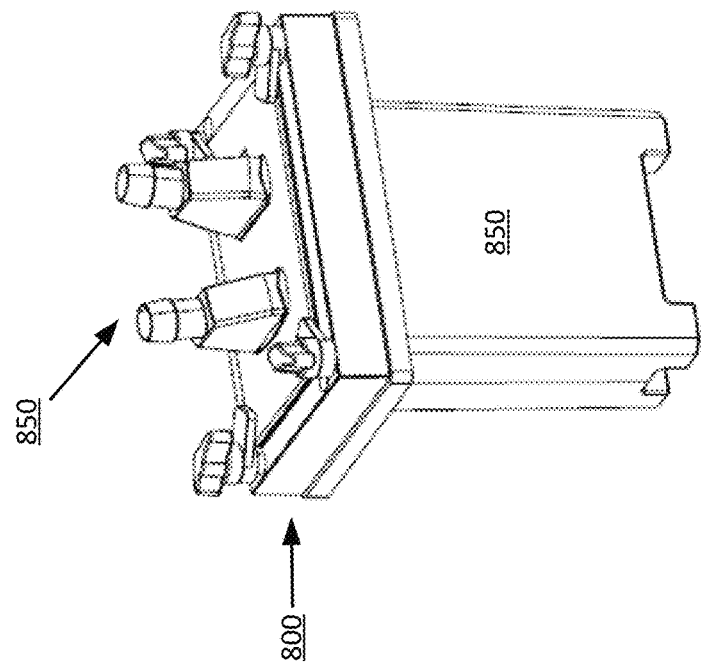
FIGS. 8A and 8B show perspective views of yet another embodiment of a Coriolis flow sensor and corresponding cradle.
Figure 8A:
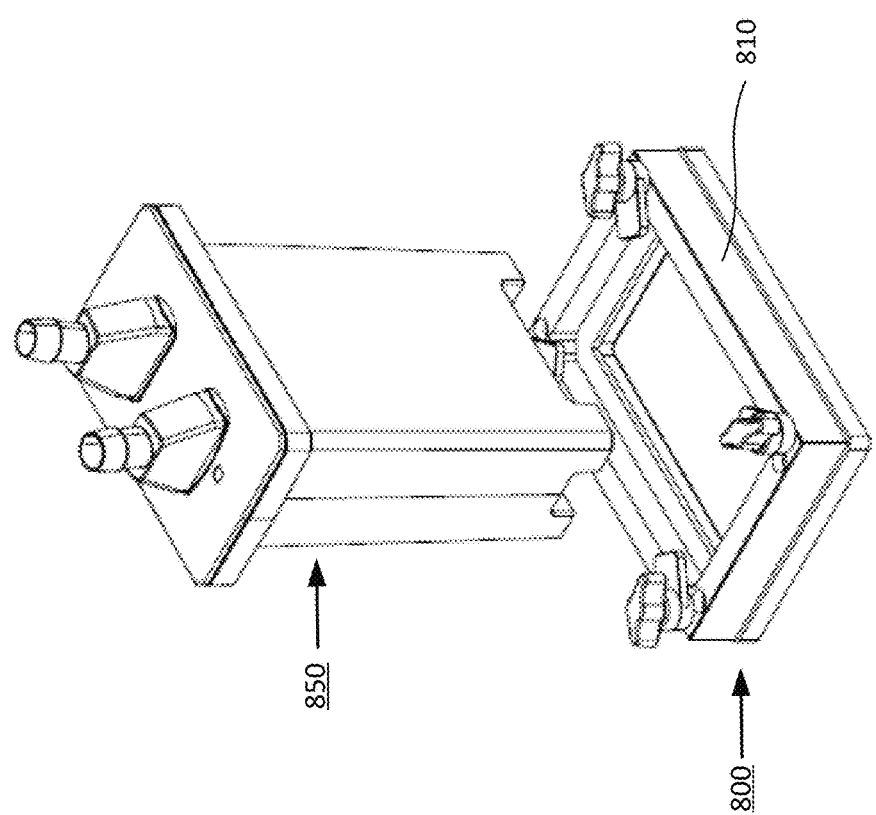
Figure 9B:
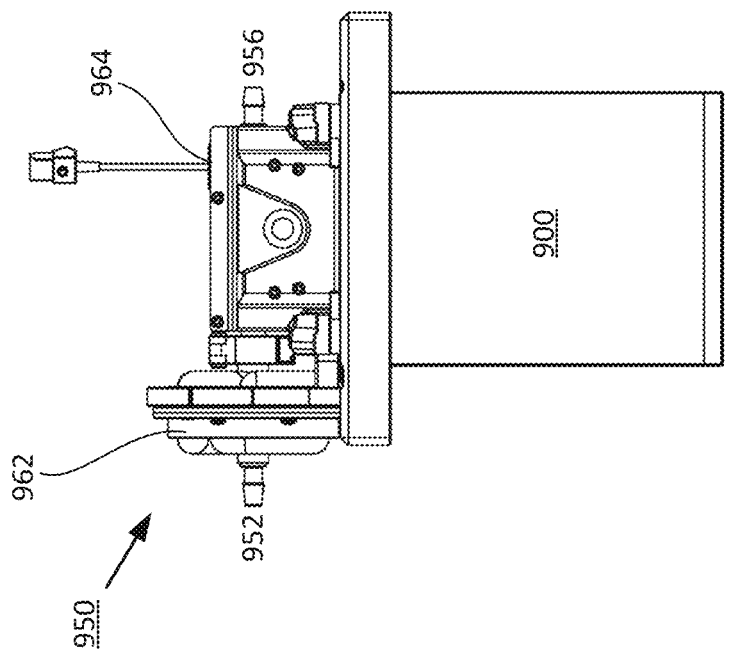
FIGS. 9A and 9B show perspective views of yet another embodiment of a Coriolis flow sensor and corresponding cradle.
Figure 9A:
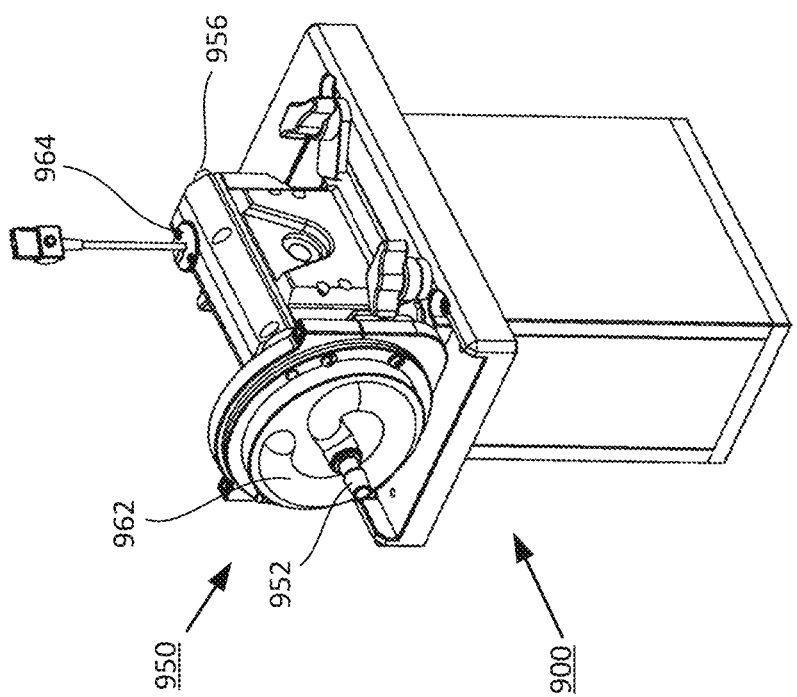

FIGS. 7-9 show perspective views of additional embodiments of a Coriolis flow sensor 750, 850, 950 and corresponding cradle 700, 800, 900. In FIG. 7, the flow sensor 750 has a vertical configuration, whereas the flow sensors in previous figures are in-line configurations. In an in-line configuration, the inlet 152 and outlet 156 are in line with each other, but the flow typically is diverted in order to flow through the flow tubes. In a vertical configuration of FIG. 7, the inlet 752 and outlet 756 are not aligned with each other, but the flow is more in line with the flow tubes. The cradle and mounting structure may be designed to accommodate multiple different flow sensors, including both in-line Coriolis flow sensors and vertical Coriolis flow sensors. In addition, in FIG. 7, the locking points 740 are on the corners rather than along the sides.

In FIG. 8, the cradle 800 includes the collar 810 but does not have an enclosure. The flow sensor 850 protrudes through the collar 810 and is visible below the collar, as shown in FIG. 8B.

In FIG. 9, the Coriolis flow sensor has an in-line configuration with inlet 952 and outlet 956. It also includes an integrated dampener 962 and integrated pressure sensor 964. The dampener 962 is located on the inlet side of the flow sensor. The integrated dampener reduces vibrations in the fluid flow itself, for example as may be caused by a pulsating pump. Example dampeners are described in U.S. patent application Ser. No. 16/994,611 "Flow Dampener in Flow Measurement System," which is incorporated by reference in its entirety. Integrating the dampener and pressure sensor reduces the overall size and space requirement, compared to free-standing dampeners and pressure sensors that are connected to tubing on the inlet or outlet. It also reduces the amount of tubing required, which in turn reduces the amount of dead volume. Dead volume is the volume of fluid contained in tubing, sensors and other components, as this volume is lost and not converted to useable product when the system is flushed between batches. Reducing dead volume is important in pharmaceutical manufacturing, because dead volume is wasted product, which can be very valuable. The integrated pressure sensor can also produce more accurate pressure readings for calibrating the Coriolis flow sensor, since it is measuring pressure closer to the actual flow tubes.

Figure 10:
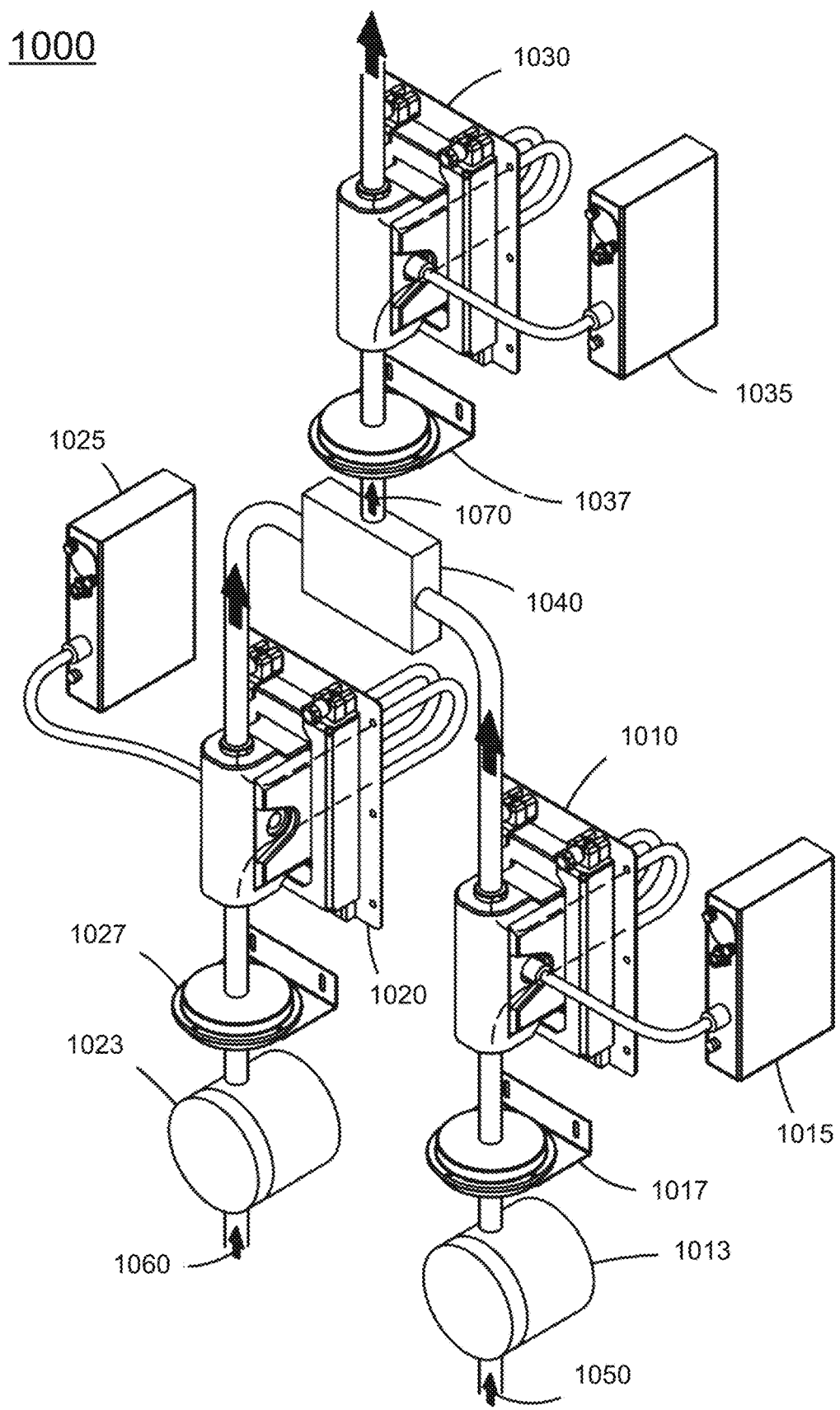
FIG. 10 is a diagram of a flow measurement system containing Coriolis flow sensors.

FIG. 10 is a diagram illustrating a flow measurement system 1000 that uses single-use or disposable flow sensors 1010, 1020, and 1030, as described above. The flow measurement system 1000 also includes two pumps 1013 and 1023, three controllers 1015, 1025, and 1035, three dampeners 1017, 1027, and 1037, and a mixing manifold 1040. The flow measurement system 1000 can be a part of a process skid, e.g., a biopharmaceutical or pharmaceutical skid. The pumps 1013, 1023 preferably are located close to the flow sensors 1010, 1020 and in-line with the flow sensors. The dampeners 1017, 1027 are used to mitigate cross-talk from the pumps 1013, 1023 to the flow sensors 1010, 1020, although they may not be required depending on the application.

Two fluids 1050 and 1060 enter the flow measurement system 1000. One fluid 1050 enters the pump 1013, which pumps the fluid through the dampener 1017 and flow sensor 1010 into the mixing manifold 1040. The other fluid 1060 enters the pump 1023, which pumps the fluid 1060 through the dampener 1027 and flow sensor 1020 into the mixing manifold 1040. The flow sensors 1010, 1020 measure flow characteristics (e.g., mass flow rate, volumetric flow rate, flow density, etc.) of the fluids 1050 and 1060, respectively.

The two fluids 1050, 1060 are combined at the mixing manifold 1040, and the mixture 1070 of the two fluids flows out of the manifold. In some embodiments, the mixing manifold 1040 also receives other fluids or matter that can be mixed or reacted with fluids 1050 and 1060 to produce fluid 1070. The mixing manifold 1040 may include a pump that pumps the fluid 1070 through the dampener 1037 and flow sensor 1030. The flow sensor 1030 measures flow characteristics of fluid 1070.

The flow sensors 1010, 1020, 1030 can operate simultaneously. In some embodiments, at least two of the flow sensors 1010, 1020, and 1030 have similar operating ranges. The controllers 1015, 1025, 1035 receive signals from the flow sensors 1010, 1020, 1030 and conducts flow analysis based on the signals. The flow analysis includes, for example, determination of flow rate based on signals representing phase shift of the flow tubes, determination of flow density based on signals representing change in resonant frequency of the flow tubes, detection of bubbles in the fluids based on change in flow density, and determination of other flow characteristics of the fluids.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A Coriolis flow sensor comprising:
   a flow tube constructed from a material with Young's modulus of at least 50 GPa; and
   an enclosure that encloses the flow tube, the enclosure constructed at least partially from a gamma transparent material, wherein the gamma transparent material and the flow tube are thin enough to permit sterilization of an interior of the flow tube by gamma irradiation of the flow tube through the gamma transparent material; and
   the enclosure shaped to facilitate locking and unlocking the Coriolis flow sensor in place on a mounting structure.

2. The Coriolis flow sensor of claim 1 wherein the flow tube is a metal flow tube.

3. The Coriolis flow sensor of claim 2 wherein the metal flow tube is constructed from a stainless steel.

4. The Coriolis flow sensor of claim 2 wherein the metal flow tube is constructed from Hastelloy, monel, nickel, titanium, or tantalum.

5. The Coriolis flow sensor of claim 2 wherein the metal flow tube is constructed from a non-magnetic metal.

6. The Coriolis flow sensor of claim 2 wherein the metal flow tube has a wall thickness not greater than the wall thickness shown in the following table:

| Outer diameter of flow tube (inches) | Maximum wall thickness (inches) |
| --- | --- |
| ¼" | 0.040 |
| ⅜" | 0.056 |
| ½" | 0.070 |
| ¾" | 0.070 |
| 1" | 0.094 |
| 2" | 0.130. |

7. The Coriolis flow sensor of claim 1 wherein the flow tube is constructed from zirconium.

8. The Coriolis flow sensor of claim 1 wherein the gamma transparent material is plastic or polycarbonate.

9. The Coriolis flow sensor of claim 1 further comprising a gamma stable memory that stores calibration data for the Coriolis flow sensor.

10. The Coriolis flow sensor of claim 1 wherein the Coriolis flow sensor has an accuracy of +/−1% of a flow rate over an operating range that has a turndown ratio of maximum flow rate to minimum flow rate of at least 200.

11. The Coriolis flow sensor of claim 1 wherein the Coriolis flow sensor is sterilizable by at least one of a clean-in-place process, a steam-in-place process, ethylene oxide cleaning, sodium hydroxide cleaning and x-ray sterilization.

12. The Coriolis flow sensor of claim 1 wherein the Coriolis flow sensor is a disposable, single-use flow sensor.

13. The Coriolis flow sensor of claim 1 wherein the Coriolis flow sensor is suitable for use in single-use applications, in multi-use applications and in continuous use applications.

14. A flow process system comprising:
   a skid for supporting equipment used in an environment that includes a flow of fluid;
   a Coriolis flow sensor for measuring a flow rate of fluid flow, the Coriolis flow sensor comprising:
      a flow tube constructed from a material with Young's modulus of at least 50 GPa; and
      an enclosure that encloses the flow tube, the enclosure constructed at least partially from a gamma transparent material, wherein the gamma transparent material and the flow tube are thin enough to permit sterilization of an interior of the flow tube by gamma irradiation of the flow tube through the gamma transparent material;
   a cradle attached to the skid, the cradle having a mounting structure for the Coriolis flow sensor, wherein the cradle has a mass of at least ten (10) times a mass of the Coriolis flow sensor and the enclosure is shaped to facilitate locking and unlocking the Coriolis flow sensor in place on the mounting structure;
   a locking mechanism that locks the Coriolis flow sensor in place on the mounting structure, wherein the locking mechanism produces sufficient locking force that the Coriolis flow sensor and cradle vibrate as a unitary body but the locking mechanism is also unlockable to release the Coriolis flow sensor.

15. The flow process system of claim 14 wherein:
   the cradle comprises a rectangular collar that includes most of the mass of the cradle; and
   the mounting structure comprises a rectangular annular lip against which the Coriolis flow sensor is mounted, the locking mechanism applying force to the Coriolis flow sensor against the lip.

16. The flow process system of claim 14 wherein the Coriolis flow sensor has a zero drift of not more than 2.5 g/min.

17. The flow process system of claim 14 wherein the Coriolis flow sensor has a zero drift of not more than 1% of a minimum flow rate measured by the Coriolis flow sensor.

18. A flow process system comprising:
   a skid for supporting equipment used in an environment that includes a flow of fluid;
   a mixing manifold mounted on the skid;
   a first flow path connected to the mixing manifold, and a first pump and a first Coriolis flow sensor positioned along the first flow path and mounted on the skid, wherein a first fluid flows through the first pump and the first Coriolis flow sensor and into the mixing manifold;
   a second flow path connected to the mixing manifold, and a second pump and a second Coriolis flow sensor positioned along the second flow path and mounted on the skid, wherein a second fluid flows through the second pump and the second Coriolis flow sensor and into the mixing manifold; and
   a third flow path connected to the mixing manifold, wherein a third fluid flows out of the mixing manifold, the third fluid comprising a mixture of the first and second fluids;
   wherein each of the Coriolis flow sensors comprises:
      a flow tube constructed from a material with Young's modulus of at least 50 GPa; and
      an enclosure that encloses the flow tube, the enclosure constructed at least partially from a gamma transparent material, wherein the gamma transparent material and the flow tube are thin enough to permit sterilization of an interior of the flow tube by gamma irradiation of the flow tube through the gamma transparent material.

19. The flow process system of claim 18 wherein each of the Coriolis flow sensors is disposable and/or single-use.

20. The flow process system of claim 18 wherein each of the Coriolis flow sensors includes a manually operable locking mechanism that permits removal and replacement of the Coriolis flow sensor in one minute or less.

* * * * *